Figure 1:
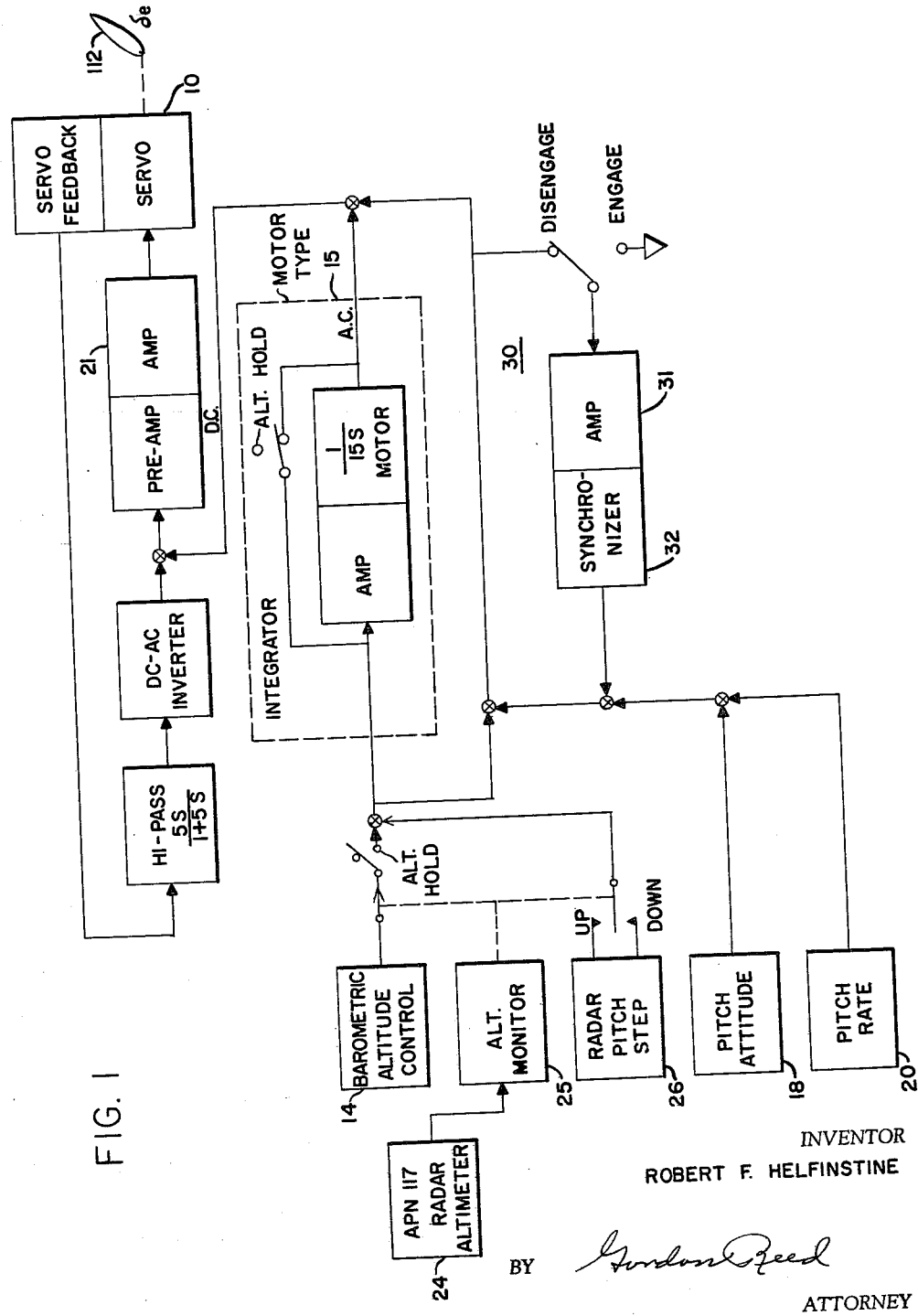

INVENTOR
ROBERT F. HELFINSTINE
BY Gordon Reed
ATTORNEY

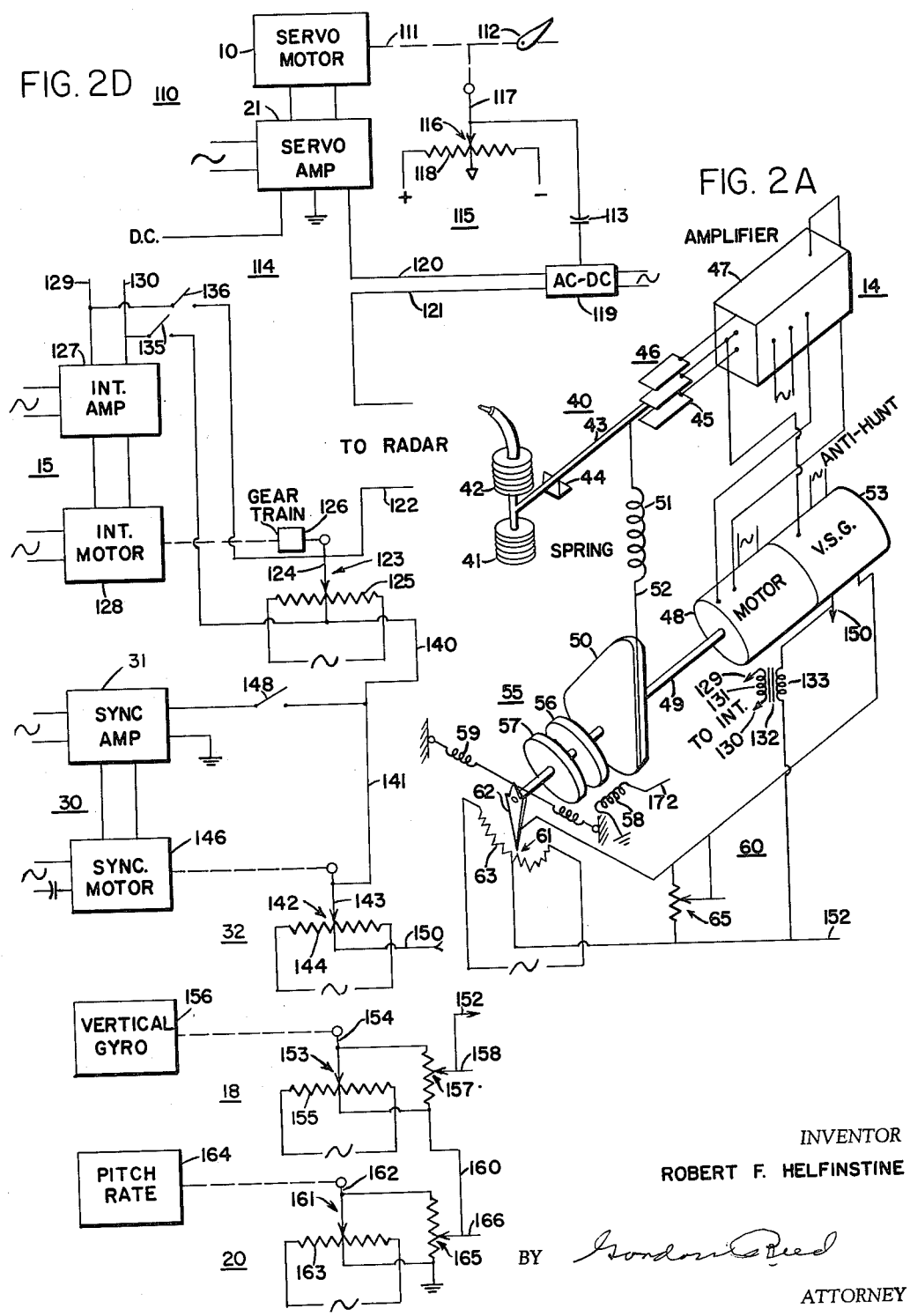

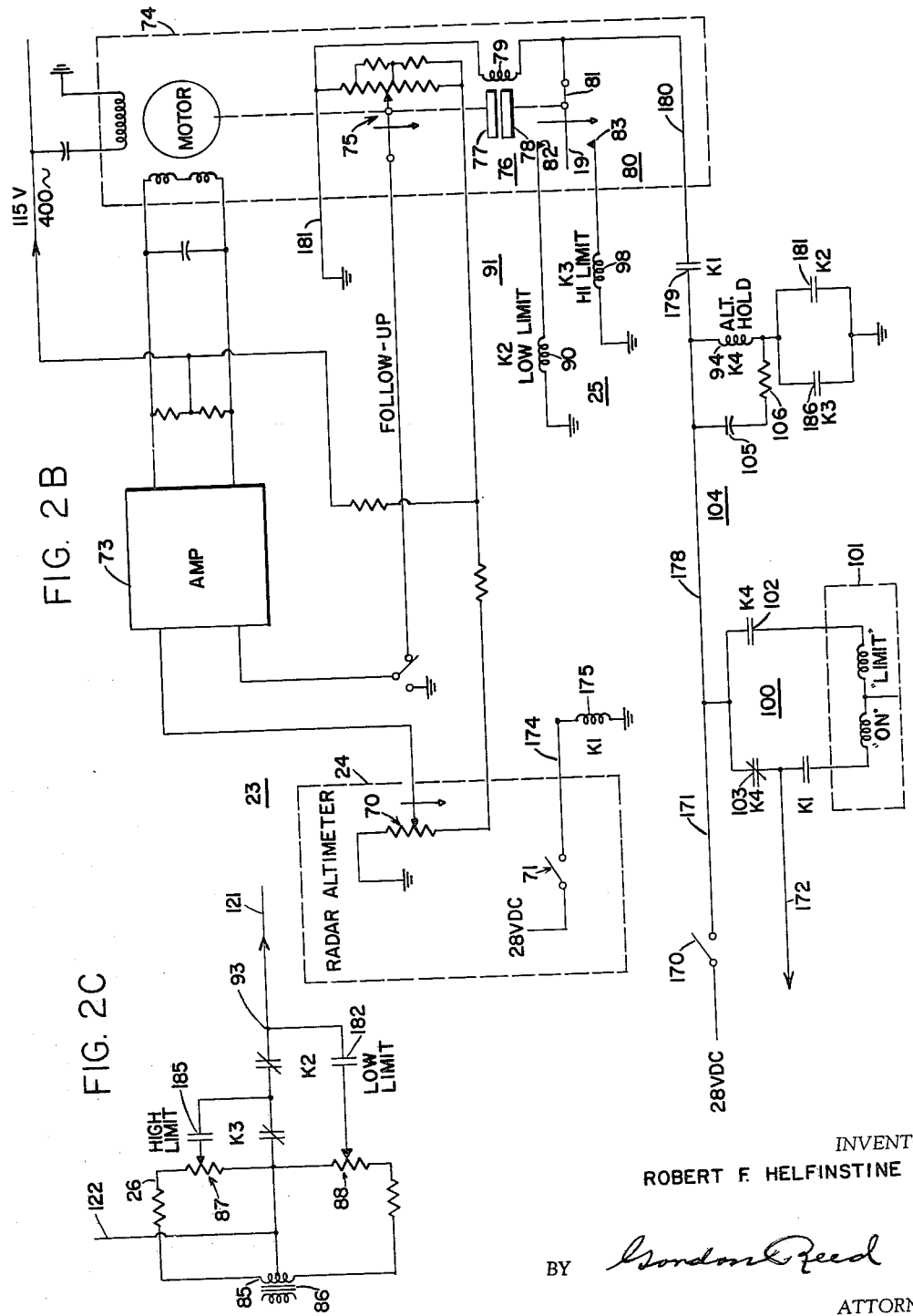

United States Patent Office 3,092,356
Patented June 4, 1963

3,092,356
CONTROL APPARATUS
Robert F. Helfinstine, Anoka, Minn., assignor to Minneapolis-Honeywell Regulator Company, Minneapolis, Minn., a corporation of Delaware
Filed Dec. 4, 1959, Ser. No. 857,421
15 Claims. (Cl. 244—77)

This invention pertains to control apparatus for aircraft and more particularly to automatic flight control apparatus for aircraft. The invention herein is more intimately involved with control of flight of the aircraft for maintaining constant attitude and constant altitude.

A desired attitude and altitude may be achieved by operating attitude control devices such as an elevator surface of an aircraft under supervision of attitude sensing and altitude sensing devices. The altitude sensing device may be of the barometric type which senses the static pressure encountered by the aircraft while in flight, through a suitable static pressure source. In some instances as when the aircraft while in flight encounters a storm front or isobaric lines, which are not always of constant height, the aircraft while under the control of such sensor may, if controlled to a constant barometric pressure, actually change height from that desired. It is desirable primarily to control the aircraft and maintain a desired height and barometric static pressure is merely one general mode of obtaining substantially a signal varying with height of the craft.

Because of the errors noted above, controlling the craft to a given static pressure results in errors in controlling the craft to a desired height.

It is an object therefore, of this invention to monitor the flight path or altitude to which an aircraft is being controlled by a barometric pressure responsive device, by a second device responsive to changes in height of the craft but dependent upon a condition other than that derived from a static pressure source.

A further object of this invention is to utilize a radar altitude sensor to monitor the response of an aircraft when under barometric altitude control.

A further object of this invention is to monitor barometric control of altitude of an aircraft by a radar altitude sensor and substituting radar altitude control for barometric altitude control when the aircraft exceeds predetermined altitude error limits.

A further object of this invention is to monitor barometric control of craft altitude by a radar altitude sensing device and substituting radar altitude control for barometric altitude control when the craft exceeds predetermined error limits and restoring the craft to barometric altitude control when the craft is subsequently within the predetermined error limits.

A further object of this invention is to monitor barometric altitude stabilization control of an aircraft in flight by a radio responsive altitude sensor and substituting a radio responsive sensor control for the barometric altitude controller when the craft altitude error exceeds predetermined high or low limits and re-establishing barometric altitude stabilization control when the craft again is within the limits, and providing a time delay between the release of radio altitude control and re-establishment of barometric altitude stabilization control.

The foregoing and other objects and advantages of the invention will appear more fully hereinafter from a consideration of the detailed description thereof which follows taken together with the accompanying drawings which illustrate by way of example one embodiment of the invention.

Referring to the drawings:
FIGURE 1 is a block diagram of the invention applied to the pitch axis control of an aircraft.

FIGURES 2A, 2B and 2C and 2D together form a schematic mechanical-electrical embodiment of the invention.

Referring to FIGURE 1, in the application of the invention to control an aircraft about its pitch axis, the control apparatus is designed to automatically operate the elevator control surface of the craft from a servomotor. The servomotor is operated to maintain desired pitch attitude and altitude. The control apparatus will hold displacements and accelerations about the pitch axis to a minimum and augment the aircraft's natural damping while controlling the aircraft to pitch attitude and altitude.

The servomotor operates the elevator control surface of the craft to control the craft about its pitch axis, and the servomotor in turn is controlled from a balanceable, elevator, control signal system. This elevator, control signal system responds to control signals derived from suitable sensors such as altitude deviation, altitude rate, (altitude deviation+altitude rate) integration, pitch attitude, pitch rate, along with high pass servo position. The above recited signals control the craft during barometric altitude and attitude stabilization of the craft.

In order to provide a monitoring function, a radar type altimeter responsive to craft height above a surface as determined from radio signals serves to disengage barometric altitude control and provide a step signal into the elevator servo control signal system when predetermined and permissible upper or lower altitude limits from a selected altitude are exceeded.

In FIGURE 1, an altitude reference controller 14 senses the barometric pressure altitude deviation or error from a desired altitude at which the altitude control was engaged. The altitude controller supplies an altitude displacement error signal and altitude rate signal during "altitude hold" to directly control the servomotor. In addition, an integral of the altitude (displacement+rate signals) also controls the servomotor 10 to obtain through integrator 15, which may be of the motor operative type having a time constant $$\frac{1}{15S}$$

a reset function to return the craft to the desired altitude despite trim changes in the craft.

The vertical reference or pitch attitude control is obtained from a vertical gyroscope 18 which establishes the lateral reference axis about which the control apparatus controls the aircraft.

Pitch rate control or pitch axis damping is obtained from a rate gyroscope 20, which may be of the two degree of angular freedom and spring restrained type, which senses angular rates of the craft about its pitch axis. The signals from the rate gyro 20 are used to increase the aircraft damping about the pitch axis.

The elevator servomotor 10 or servo actuator comprises a motor coupled to the elevator control surface 112 and energized through alternatively operated relays (not shown) controlled from a discriminator amplifier 21 which energizes one or the other of the relays as is well known in accordance with the phase of the A.C. signal supplied thereto from the balanceable elevator control signal system.

For purposes of monitoring the barometric altitude control, a radar altitude device 24 is utilized. The radar altimeter device may be of the AN/APN–117 or AN/APN–22 type. The latter is disclosed in the "Handbook Service Instructions Radar Set AN/APN–22" in publication HN16–30 APN22–2, dated June 15, 1954, and published under the authority of the Secretary of the Air Force and Chief of the Bureau of Aeronautics. Note paragraph 4–107 on page 28 and FIGURES 4–10 of the Handbook. The altitude control signal from the radar altimeter 24 is applied to an altitude monitor 25 which operates in accordance with the radar sensed altitude and functions to disengage or terminate barometric altitude control when high or low limit altitude errors occur and substitute a radar pitch step input from a signal source 26 to reduce such error.

The automatic pitch control apparatus also is designed such that no control system transients shall be experienced upon engagement of the automatic attitude and altitude control apparatus and for this purpose, a synchronizing arrangement 30 comprising an amplifier 31 and a synchronizer motor 32 are provided. The operation of synchronizer 32 supplies a control signal for balancing the control signal circuit of the servomotor amplifier 21 in the "disengage" mode or prior to engaging automatic control.

In the following detailed description of FIGURES 2A, 2B, 2C, and 2D the barometric altitude sensor; the radar altitude monitor; and the control surface servomotor together with its control network will be separately described, and the joint relationship of the three units will be considered under the Operation of the entire apparatus.

In FIGURE 2A, the barometric altitude control 14 provides altitude information to the flight control apparatus. It is of a force rebalance, pressure transducing type, developing incremental altitude error and rate of altitude change signals during constant altitude control of the craft. The basic components of the altitude controller 14 are a sensing unit 40, an amplifier 47, a follow-up motor 48, an altitude displacement error potentiometer 61, a clutch 55, and rate generator 53.

The sensing unit 40 comprises an evacuated bellows 41 and a static pressure responsive bellows 42 which jointly operate a lever 43 having a fulcrum 44. The opposite end of the lever 43 adjusts a variable capacitor type pickoff or signal device 46 through a movable capacitor plate 45. Signals developed in the capacitor pickoff 46 are applied to amplifier 47 which controls the operation of the follow-up motor 48. The output shaft 49 of motor 48 drives a cam 50. The cam 50 is connected through a spring 51 and driveable tape 52 to an intermediate point of the lever 43 to null the capacitor pick-off 46.

The follow-up motor 48 drives rate generator 53 to supply anti-hunt control voltages to the input side of amplifier 47 and also supplies an altitude rate signal to the aircraft control apparatus.

The motor 48 through its out shaft 49 also operates a driving member 56 of an electro-magnetic clutch 55. The driving member 56 is associated with the driven member 57 through a magnetic clutch winding 58 which brings the clutch members into driving relationship. When the winding 58 is de-energized, a centering spring 59 serves to return the driven member 57 to a normal centered or unoperated position. A slider 62 of a displacement potentiometer 61 is carried on the driven member 57 of the clutch and the slider coacts with a potentiometer resistor 63 energized from a suitable A.C. supply. The output of the potentiometer 61 which appears between slider 62 and a center tap of resistor 63 is modified by a gain control or voltage dividing potentiometer 65.

The above altitude sensing device 14 is generally similar to that disclosed in Patent 2,820,188 to Kutzler with the exception that different centering means are provided for the displacement potentiometer slider as slider 62 herein.

The radar altitude monitor of FIGURE 2B comprises a radar altimeter 24 such as the AN/APN/117 or AN/APN/22, the altitude monitor 25, and radar pitch step signal source 26.

The radar altimeter 24 includes an output potentiometer 70 supplying an A.C. autopilot control signal, and a reliability, single pole single throw, manually operated switch 71 for applying to the servomotor control apparatus the radar altitude monitor.

The altitude monitor unit comprises a signal control amplifier 73 which may be of the A.C. discriminator type; a control motor 74 which may be reversible two-phase motor such as a capacitor type induction motor; a follow-up or rebalance potentiometer 75; a clutch 76 of the electro-magnetic type comprising a driving member 77, driven member 78, and clutch engaging winding 79.

Signals from potentiometer 70 of the radar altimeter are supplied to the amplifier 73 which in turn operates motor 74 in a direction in accordance with the phase of the applied signal. Motor 74 in turn drives rebalance potentiometer 75 which supplies a follow-up signal to the amplifier 73 in known manner. Thus the displacement of the slider of the potentiometer 75 from a normal position is in accordance with the magnitude of the control signal from potentiometer 70.

The driven member 78 of clutch 76 operates a movable contactor 81 of a switch assembly 80 to engage either of two opposed contacts 82, 83, for a purpose to be described.

The radar pitch step circuit 26 which controls the craft when barometric control is removed on altitude errors exceeding predetermined limits comprises a secondary winding 85 of a transformer 86, a "high limit" potentiometer 87 and a "low limit" potentiometer 88 which are connected in series and across the energizing secondary winding 85.

Reverting to the contactor switch assembly 80, when the adjustable contactor 81 engages the "low limit" contact 82, a circuit is completed for energizing winding 90 of the "low limit" relay 91, also designated the "K-2" relay. On energization of the "K-2" relay by reference to FIGURE 2C radar pitch step circuit 26 supplies at a terminal 93 a signal of such phase as to cause an effect in the apparatus or a pitch-up step signal. Additionally, energization of the "K-2" relay 91 closes a circuit through an operating winding 94 of a "K-4" or altitude hold relay.

On the other hand, if the movable contactor 81, FIGURE 2B, engages the "high limit" contact 83 a circuit is completed through an operating winding 98 of a relay 99 or "K-3" relay. Energization of the "K-3" relay results in a voltage derived from potentiometer 87, FIGURE 2C and applied at terminal 93 of the radar pitch step circuit 26 to be of such phase as to call for a pitch down effect on the control apparatus as will be subsequently described. Additionally, energization of the "K-3" relay also energizes the operating winding 94 of the "K-4" or altitude hold relay.

Energization of the "K-4" relay closes a circuit through a pair of normally open contacts 102 to operate the pointer of an altitude monitor indicator 101. Operation of relay "K-4" additionally opens the circuit through a set of normally closed contacts 103 for the barometric altitude engage clutch 58.

When the movable contactor 81 is disengaged from either contact 82 or 83, either the "K-2" or "K-3" relay if energized will be de-energized thereby opening the circuit of the operating winding 94 of the "K-4" relay through the set of relay contacts. However, a holding circuit 104 comprising a capacitor 105 and resistor 106 is connected across the relay operating winding 94 to maintain the winding energized for a selected time interval following the de-energization of relays "K-2" or "K-3," as the case may be. The purpose of this time delay will be considered hereinafter.

The pitch axis control channel of FIGURE 2D other than the barometric altitude sensor and the radar altitude monitor comprise a servo means 110 consisting of a servomotor 10 that operates through its output shaft 111 an elevator control surface of an aircraft for control thereof about its pitch axis. The servomotor is reversibly controlled from a servo amplifier 21 which may be of the A.C. discriminator type and reversibly controls the servomotor 10 in accordance with the phase relationship between the A.C. control signal supplied to the amplifier and the A.C. power supplied thereto. The amplifier-servo combination may for example be similar to that disclosed in Patent 2,942,806 of George W. Rusler, Jr., and Peter P. Lundquist, filed March 11, 1955.

Control signals to servo amplifier 21 are derived from a balanceable signal voltage network 114. The control network 114 comprises a servo feedback signal generator 115; radar pitch step input signal generator 26; an integral of (altitude displacement and altitude rate) signal generator 123; a network synchronizing signal generator 142, a barometric (altitude error and altitude rate) signal generator 60; an aircraft pitch attitude signal generator 153; and an aircraft pitch rate signal generator 161.

The signal generator 115 comprises a rebalance or servo follow-up potentiometer 116 having a slider 117 positioned by the output shaft 111 of the servomotor 10 and a resistor 118 connected across a D.C. power supply and having a center tap connected to signal ground. The voltage output of the potentiometer which may vary in magnitude and polarity with servo displacement from a normal position is transmitted from slider 117 through a high-pass feedback condenser 113 to a D.C. to A.C. phase sensitive converter 119. The output of the converter 119 is an A.C. signal of transient character only and exists only during actual displacement of the elevator surface 112. An amplifier input conductor 120 extends from one control electrode of amplifier 21 to the converter 119. The opposite side of the converter 119 has extending therefrom a conductor 121 to apply the transient feedback signal to the control network 114 of amplifier 21 through radar pitch step circuit 26, FIGURE 2C.

The radar controlled pitch step circuit 26 as stated comprises the potentiometers 87, 88 connected across the secondary winding 85 of transformer 86. Extending from the junction of potentiometers 87, 88 in series with a normally closed set of contacts of relay "K-3" and a normally closed set of contacts of relay "K-2" is the conductor 121. Connected to and extending from the center tap of secondary winding 85 is conductor 122.

The time integral signal generator or potentiometer 123 comprises of slider 124 and its coacting resistor 125. The slider 124 is operated in either direction from a center tap of resistor 125 through a speed reducing gear train 126 by an integrating motor 128. Motor 128 may be of the capacitor-induction type which is controlled from an integral amplifier 127. The integral amplifier 127 may be of the A.C. phase discriminator type and has input conductors 129, 130 connected to a secondary winding 131 of an isolation transformer 132 in the barometric controller 14. The transformer 132 includes a primary winding 133 energized in accordance with both the altitude displacement error and altitude rate. For the purpose of resetting the slider 124 of potentiometer 123 to the midpoint of resistor 125, two single pole single throw switches 135, 136 are available to connect the input control conductors 129, 130 to the slider and center tap of resistor 125. The conductor 122 extends to slider 124.

The synchronizing signal generator or potentiometer 142 comprises an adjustable slider 143 and a center tapped resistor 144. The slider 143 is adjusted in either direction from the center tap of resistor 144 by a synchronizing motor 146. The synchronizing motor 146 is reversibly controlled from a synchronizing amplifier 31 which may receive control signals through a single pole single throw switch 148. While the synchronizer arrangement 30 is indicated as an A.C. discriminator amplifier and capacitor type induction motor, the synchronizing motor may alternatively take the form of that disclosed in the aforesaid Rusler and Lundquist patent as shown in FIGURE 1 as motor 154 which may be of the permanent magnet field type and having its armature connected to a D.C. supply by way of an A.C. discriminator amplifier. Conductors 140, 141 in series extend from the center tap of the potentiometer resistor 125 to slider 143.

The barometric altitude signal generator 60 comprises the altitude displacement error potentiometer 61 having a slider 62 displaced relative to the center tap of its coacting resistor 63 in accordance with the craft altitude error from a desired altitude. The signal generator 60 also includes an altitude rate signal generator 53. One side of the barometric generator 60 is connected to a center tapper of the resistor 144 by conductor 150 and the opposite side of signal generator 60 has a conductor 152 extending therefrom.

The craft pitch attitude signal generator or potentiometer 153 comprises an adjustable potentiometer slider 154 and potentiometer resistor 155. Potentiometer slider 154 is positioned relative to its coacting resistor 155 either direction from a center tap thereof in accordance with the craft pitch attitude as sensed by a vertical gyroscope 156. The signal voltage between slider 154 and the center tap of resistor 155 is applied across a voltage dividing or gain potentiometer 157. The conductor 152 extends to an adjustable slider 158 of the voltage dividing potentiometer 157.

Pitch rate of the craft is provided by a potentiometer type signal generator 161 having an adjustable slider 162 and potentiometer resistor 163. Slider 162 is displaced in either direction relative to a center tap of resistor 163 by a suitable pitch rate sensing device 164 which may be a conventional restrained, two axis of freedom gyroscope. The output of signal generator 161 is applied to a voltage dividing potentiometer 165. One side of the resistor of potentiometer 165 is connected to signal ground which is common to the ground of amplifier 21 and a conductor 160 extends from adjustable tap 166 to one end of the resistor of gain control potentiometer 157, to complete the control circuit of amplifier 21.

*Operations*

In the period prior to that in which the control apparatus through servomotor 10 is to operate the control surface 112, radar monitoring application switch 71 in the radar altitude monitor FIGURE 2B, is in the open position, barometric altitude hold switch 170 is in the open position, integrator recentering switches 135 and 136, FIGURE 2D, are closed to effect operation of the integrator motor 128 to center slider 124, switch 148 is in the closed position to effect operation of the synchronizer motor 146 and slider 143 to balance any control signals from signal generators 153 or 161 and any other unbalanced signals in the portion of the amplifier control circuit below conductor 141. In the barometric altitude controller 14, slider 62 is spring centered to its center position on resistor 63 to engage the center tap thereof.

When the craft is in the desired attitude and altitude, barometric altitude hold as well as pitch attitude hold are applied to the control circuit 114 by opening switch 148, FIGURE 2D, and closing altitude hold switch 170, FIGURE 2B. Closing of switch 170 completes the circuit from a 28 volt D.C. supply, switch 170, conductor 171, "K—4" relay normally closed contacts 103, conductor 172, through the operating winding 58 of the barometric altitude clutch 55, to ground. Opening of switch 148 disconnects the synchronizer amplifier 147 from the control network 114.

Switches 135 and 136 are in open position. Altitude displacement error and altitude rate signals from transformer 132 are applied to the integrating amplifier 127 which causes operation of the integrator motor 128 to displace the slider 124 in accordance with the time integral of the altitude displacement error and altitude rate combined. Integrator motor 128 is of the type wherein its rate of operation is proportional and thus in accordance with a control signal supplied to its amplifier 127 and thus its displacement is a time integral of the sum of altitude displacement error and altitude rate.

Should the aircraft tend to change altitude from the barometric altitude existing when the clutch winding 58 was energized, the slider 62 will be displaced relative to the center tap of resistor 63, thus an altitude displacement error is provided by the potentiometer 61.

The sensing arrangement 46 in sensing the changes in position of the lever 43 during altitude changes supplies a control signal to amplifier 47 which operates the follow-up motor 48. Motor 48 alters the tension in spring 51 to recenter the pivoted lever 43 and null the pick-off 46. The follow-up motor 48 operates the rate generator 53 which develops a signal in accordance with the altitude rate of the craft.

Thus on potentiometer 123 there is obtained an integral of the displacement and altitude rate and between conductors 150 and 152 there is provided in the control network 114 a voltage signal in accordance with the sum of an altitude displacement error and an altitude rate. Thus the aircraft is maintained at the desired barometric altitude.

Should it be desired to monitor the fidelity of control of the barometric altitude controller 14, the switch 71 may be closed which completes a circuit from a 28 volt D.C. supply, switch 71, conductor 174, an operating winding 175 of a "K-1" relay, to ground. Energization of the "K—1" relay completes a circuit from energized conductor 171, a conductor 178, normally opened contacts 179 of the "K—1" relay, conductor 180, operating winding 79 of clutch 76, conductor 181, to ground.

Ideally, the barometric altitude controller 14 and the radar altitude monitor 23 should have the same response, in other words, the movable contactor 81 of the radar monitor should be intermediate its associated fixed contacts 82, 83 when the altitude displacement potentiometer slider 62 is at the center tap of potentiometer resistor 63. However, due to storm fronts or other conditions when the barometric altitude sensor follows isobars not having a constant linear altitude, the barometric sensor 14 may not have the same response as the radar altitude monitor 23. In some situations, while the barometric altitude sensor 14 may be actually maintaining the craft at a certain barometric pressure and thus at an assumed constant linear altitude, the linear altitude may differ from that existing on closing of switch 170. Consequently, the contactor 81 may be displaced from its center position in one direction or another to engage contact 82 or 83.

In the event contactor 81 engages contact 82, the "K-2" low limit relay is energized, hence through a set of normally open contacts 181 thereof completes a circuit through operating winding 94 of the "K-4" relay. The operation of the "K-4" relay opens the circuit for the electromagnetic clutch winding 58 of barometric controller 14 permitting spring 59 to restore slider 62 to the center point of resistor 63 thereby developing no displacement error signal.

At the same time a pitch-up signal is supplied from potentiometer 88 through a normally open set of contacts 182 of relay "K-2" to conductor 121 and control network 114.

This pitch-up signal causes the aircraft to change to a pitch up attitude. The radar altimeter 24 and motor 74 in response to the increase in craft altitude resulting from the pitch-up attitude moves the contactor 81 away from contact 82. This separation of contactor and contact opens the circuit of operating winding 90 of the "K-2" relay and removes from network 114 the signal from step-up potentiometer 88.

If the "K-4" relay were de-energized immediately following the separation of contacts 81 and 82, full barometric altitude control from potentiometer 61 to network 114 would be restored. This would imply that barometric altitude control would be in effect approximately at the "low limit" of permissible radar altitude. Inaccuracies in the altitude pressure source or other conditions would result in frequent engagements of contacts 81, 82 resulting in frequent application of the signal from the pitch-up potentiometer 88 to network 114. To avoid such frequent applications of the step radar signal to network 114, the "K-4" relay has been provided with a hysteresis effect through the delay circuit 104 comprising capacitor 105 and resistor 106 which delays the return to barometric altitude control from potentiometer 61 a selected time interval after the de-energization of the "K-2" relay. During such period of delay, the aircraft under the initial radar step pitch-up control signal will approximately attain the linear altitude at which contactor 81 is intermediate contacts 82 and 83. At this time, barometric altitude will be resumed by the de-energization of operating winding 94 of the "K-4" relay and thus the re-energization of clutch winding 58 of altitude controller 14.

In the above operation, it should be noted that the potentiometer slider 62 has been reset to unoperated position by springs 59 so that subsequent barometric altitude control is that determined by the barometric pressure at which winding 58 was re-energized. In the present instance, consider when relay "K-2" had been energized, the barometric pressure controlling when electromagnetic clutch winding 58 was re-energized following the insertion of the pitch-up signal is lower than that barometric pressure controlling when the winding 58 was initially energized upon closing switch 170.

It will readily be appreciated that if the movable contactor 81 engages contact 83 or the "high limit" contact that relay winding 98 will be energized thereby to apply a pitch step down signal from potentiometer 87 and through normally open contacts 185 of the "K-3" relay to the control network 114. This is accompanied by the de-energization of clutch winding 58 of altitude controller 14 as in the "low limit" condition.

Thus the aircraft through its barometric controller 14 operates on network 114 to maintain constant barometric altitude of the craft, and in the event that the radar altimeter monitor determines that the error in linear altitude determined by radio signals is above or below predetermined linear altitude errors or limits as determined by the spacing contacts 82, 83 relative to movable contact 81 that a pitch step signal will be applied to return the craft within the desired limits monitored. In general, the step signal is greater than the altitude displacement error signal but is usually of the same phase, but in some instances as in following isobars may be of opposite phase.

It will thus be evident that I have provided a novel control apparatus which automatically operates the elevator surface or pitch attitude control device of an aircraft whereby the aircraft can maintain a desired pitch attitude and barometric pressure altitude and that such barometric altitude is monitored and corrected by a radar altitude sensor that maintains the barometric sensor control of craft altitude at an absolute linear altitude or distance relative to a datum. Thus as the static or barometric pressure changes at a given linear height, the barometric controller which responds to such pressures is reset to another pressure obtaining at the same linear height on such occasions that the relationship of pressure altitude and linear altitude exceed a predetermined quantity.

While the invention has had its application to the monitoring of barometric altitude by a radar altitude responsive device, it will be apparent that many changes in the above construction will suggest themselves so that other variables than altitude may be monitored and thus many wide and different embodiments of the invention could be made without departing from the principal thereof, it is intended therefore that the above description and drawing shall be considered illustrative and not in a restrictive sense.

What is claimed is:

1. In flight control apparatus for dirigible craft such as an aircraft having an adjustable control surface for changing altitude of the craft and motor means operating said surface, in combination: barometric altitude responsive signal generating means displaceable from a null position, generating a displacement error signal in accordance with craft deviation from a predetermined pressure sensed altitude, connected to said motor means for operation thereof by said signal; a radar altitude responsive means controlled by radio signals and thus operated in accordance with radio sensed changes in craft altitude, alternatively to said barometric altitude responsive means controlling said motor means; and means responsive to a predetermined magnitude change in radar altitude of the craft sensed by the radar altitude responsive means and connected to both said barometric altitude and radar altitude responsive means and rendering ineffective said barometric altitude signal generating means on said motor means and rendering said radar altitude means effective on said motor means for further operation thereof to reduce the radar altitude change.

2. The apparatus of claim 1, and means for nulling said barometric altitude responsive signal generating means during the disconnection of said barometric altitude responsive means and said motor means.

3. In automatic altitude maintaining apparatus for an aircraft having a moveable elevator control surface, said apparatus including servomotor mens operating said surface, in combination: a barometric pressure altitude responsive device; a signal generator operated thereby and generating a signal when the craft departs from a predetermined barometric altitude, said signal generator being connected to said servomotor means for operation thereof to maintain barometric altitude; a radar altitude responsive means; a source of step signal controlled thereby and operating said servomotor means independently of said barometric altitude means, said radar altitude controlled signal source being normally disconnected from said servomotor means; and means responsive to a predetermined change in radar sensed altitude nulling said barometric altitude controlled signal generator thereby rendering it ineffective on said servomotor means and connecting said radar altitude signal source to said servomotor means for control thereof.

4. In flight control apparatus for an aircraft having motor means controlling a flight condition of the craft: sensing means including first error signal providing means responsive to a change in a desired flight condition in terms of one characteristic of such change and displaceable from a null position normally controlling said motor means to maintain the desired condition; a second error sensing means responsive to the flight condition in terms of a different characteristic thereof and monitoring the control of said condition by said first error signal providing means and effective on said error of the second sensing means exceeding a predetermined magnitude interrupting control of said motor means and condition by said first error signal providing means and controlling the motor means and thus said condition by said second error sensing means; means returning said first error signal providing means to null position during the said interruption of said control, said first error signal providing means resuming control of said motor means when said error of the second sensing means again is less than the predetermined magnitude.

5. In flight control apparatus for an aircraft having an elevator surface and motor means operating said surface to control craft altitude: a barometric pressure sensor; first signal providing means operated by said sensor responsive to a change in craft barometric pressure altitude and displaceable from a null position normally controlling said motor means to maintain a desired barometric altitude; second means selectively connected to said first means and responsive to altitude determined by radio responsive means and monitoring the control of said altitude by said first means and effective on said radio determined altitude differing by a predetermined magnitude from the desired barometric altitude interrupting control of said motor means by said first signal providing means and controlling the motor means by said second or radio means; means returning said barometric responsive first signal providing means to a null position during the said interruption of said control, and time delay means connected to said second means and controlled thereby and returning said barometric pressure sensor and first signal providing means to control of said motor means an interval after said altitude difference is less than the predetermined magnitude, said barometric means resuming control of said motor means when said altitude difference again is less than the predetermined magnitude.

6. In flight control apparatus for an aircraft having attitude control means operated by motor means to control aircraft altitude, in combination: first means including barometric pressure sensor operated means responsive to change in altitude and displaceable from a null position normally controlling said motor means to maintain barometric sensed altitude; a radio controlled altitude determining means responsive to radio altitude monitoring the control of altitude by said barometric means; third means controlled by the radio altitude means and effective on craft altitude varying a predetermined magnitude from a desired radio altitude interrupting control of said motor means by said barometric operated first means and controlling the motor means and thus the altitude by said third means; centering means returning said barometric operated means to null position during the said interruption of said control, said third means being effective to restore said first means to control of said motor means when said altitude variation again is less than the predetermined magnitude.

7. In flight control apparatus for an aircraft having attitude control means operated by motor means to control craft attitude, in combination: first sensing means responsive to a change in a flight condition; a first signal generator; a first clutch means connecting the first responsive means to said first signal generator; a second means responsive to a change in flight condition; a second operable clutch; a contactor operable through said second clutch from said second responsive means; means for energizing both clutches; means controlling said motor means from said first signal generator; means effective when said contactor is displaced a predetermined extent interrupting control of said first signal generator from said first responsive means; means nulling said first signal generator during such interruption; and means reconnecting said first responsive means to said first signal generator when said contactor displacement is less than the predetermined displacement.

8. In control apparatus for an aircraft having an elevator control surface and a servomotor adapted to operate said surface, in combination: radar altitude means generating a signal when the craft departs by a predetermined amount from a predetermined altitude and connected to said servomotor for operation thereof; a barometric altitude signal generator having its connection to the servomotor controlled by said radar altitude means and adapted to operate said servomotor independently of said radar altitude signal generator; and means responsive to a predetermined operation of said radar altitude responsive means when the departure in altitude is less than the predetermined amount disconnecting said radar altitude signal generator and connecting said barometric altitude signal generator to said servomotor.

9. An altitude monitoring and correction device for an automatic pilot for an aircraft having a servo system controlling the elevator surface and therefore the pitch attitude of the craft, in combination: barometric altitude responsive means generating a signal upon error in barometric altitude of said craft; a radio means operated signal generator responsive to radio determined displacement from a desired position; means controlled by the radio means substituting said radio means signal generator for said barometric altitude responsive signal generator; and means nulling said barometric responsive signal generator during such substitution.

10. In an automatic pilot for an aircraft having a servo system for controlling the pitch attitude of the craft, in combination: means comprising a barometric type altitude sensor generating a signal upon error between position of said aircraft and desired barometric pressure; a radio responsive means including a signal generator responsive to radio determined displacement from a desired position; and means control by the radio responsive means and effective when the radio determined displacement reaches a predetermined magnitude, rendering ineffective said barometric altitude responsive means and controlling said servo system from said radio means signal generator.

11. In an automatic pilot having a servo system controlling the pitch attitude of the craft, including a vertical gyroscope for generating a signal upon pitch error between the craft and vertical gyroscope, in combination: barometric altitude responsive means generating a signal upon change in barometric altitude from a desired altitude, additionally controlling said servo system; a radio means including a signal generator responsive to radio determined displacement from a desired position; and means controlled by the radio means rendering ineffective said barometric altitude signal generator and controlling said servo system from said radio means signal generator upon the existence of the radio determined displacement from a desired position.

12. In an automatic pilot for an aircraft adapted for pitch attitude and barometric altitude hold control and including a servomotor controlled to pitch attitude and barometric altitude operating an elevator surface of the craft, in combination: a radio altimeter means sensing radar altitude changes of the craft; a motor controlled by the radar altimeter and displaceable in accordance with the change in radar altitude; means driven by said motor and generating a signal upon predetermined displacement thereof from a null position; and further means controlled by said signal upon predetermined displacement of said motor for controlling said servomotor and rendering barometric altitude hold control ineffective on said servomotor.

13. In flight control apparatus for an aircraft having an elevator surface and motor means operating said surface to control craft altitude: a barometric pressure operated device; first means operated by said device and thus responsive to a change in craft barometric pressure altitude and displaceable from a null position normally controlling said motor means to maintain a desired barometric altitude; second means connected to said first means and responsive to altitude determined by radio responsive means and monitoring the control of said altitude by said first means and effective on said craft altitude differing by a predetermined magnitude from the desired radio altitude interrupting control of said motor means by said first means and controlling the motor means by said second or radio means; means returning said barometric responsive first means to a null position during the said interruption of said control; and time delay means connected to said second means and controlled thereby and returning said barometric means to control of said motor means an interval after said altitude difference is less than the predetermined magnitude.

14. An automatic altitude maintaining apparatus for a dirigible craft such as an aircraft having a moveable elevator control surface, said apparatus including servomotor means operating said surface, in combination: a barometric pressure altitude responsive device; a signal generator operated thereby and generating a signal when the craft departs from a predetermined barometric altitude, said signal generator being connected to said servomotor means for operation thereof to maintain barometric altitude; a radar altitude responsive means; a source of signal controlled thereby and operating said servomotor means independently of said barometric altitude means, said radar altitude controlled source being normally disconnected from said servomotor means; means responsive to a predetermined change in radio altitude nulling said barometric altitude control signal generator thereby rendering it ineffective on said servomotor means and connecting said radar altitude signal source to said servomotor means for control thereof, said radar signal source developing a signal of opposite phase than the signal from the barometric operated signal generator when the barometric height and radar height are inconsistent following initial barometric altitude control.

15. In flight altitude maintaining apparatus for an aircraft having movable control elements to change altitude thereof and a servomotor means operating said control elements, in combination: a radar altimeter responsive first signal generator, thus responsive to one characteristic of altitude, generating a signal when the craft departs a predetermined extent from a desired altitude and connected to said servomotor means for operation thereof; a barometric altimeter responsive second signal generator, thus responsive to another characteristic of altitude, adapted for operating said servomotor means independently of said radar altimeter responsive generator, said barometric altimeter responsive signal generator being disconnected from said servomotor means during connection of said radar altimeter responsive generator to said servomotor means; and means responsive to a predetermined magnitude of radar altimeter sensed change in altitude disconnecting said first signal generator from said servomotor means and connecting said second signal generator to said servomotor means for maintaining craft altitude.

References Cited in the file of this patent

UNITED STATES PATENTS

| | | |
|---|---|---|
| 2,611,560 | Harcum et al. | Sept. 23, 1952 |
| 2,662,207 | Hollister | Dec. 8, 1953 |
| 2,830,291 | Hecht et al. | Apr. 8, 1958 |
| 2,930,035 | Altekruse | Mar. 22, 1960 |